(12) United States Patent     (10) Patent No.: US 8,723,082 B2
Spiesberger     (45) Date of Patent: May 13, 2014

(54) DEVICE FOR TRANSPORTING A WELDING WIRE

(75) Inventor: Alfred Spiesberger, Buchkirchen (AT)

(73) Assignee: Fronius International GmbH, Pettenbach (AT)

(*) Notice: Subject to any disclaimer, the term of this patent is extended or adjusted under 35 U.S.C. 154(b) by 1685 days.

(21) Appl. No.: 11/631,065

(22) PCT Filed: Jul. 11, 2005

(86) PCT No.: PCT/AT2005/000263
§ 371 (c)(1),
(2), (4) Date: Dec. 28, 2006

(87) PCT Pub. No.: WO2006/005096
PCT Pub. Date: Jan. 19, 2006

(65) Prior Publication Data
US 2008/0067161 A1    Mar. 20, 2008

(30) Foreign Application Priority Data

Jul. 9, 2004 (AT) .................................. A 1166/2004

(51) Int. Cl.
*B23K 9/10* (2006.01)

(52) U.S. Cl.
USPC .................................. 219/137.7; 219/137.2

(58) Field of Classification Search
USPC ................. 219/137.7, 137.2, 86.23, 86.24
See application file for complete search history.

(56) References Cited

U.S. PATENT DOCUMENTS

| 3,550,830 A | 12/1970 | Lagogue |
| 3,596,041 A * | 7/1971 | Frus et al. ................ 219/73.21 |
| 3,737,614 A * | 6/1973 | Paulange ................ 219/60 A |
| 4,177,912 A | 12/1979 | Samokovliski et al. |
| 4,229,637 A * | 10/1980 | Dederer et al. ............ 219/86.25 |
| 6,427,894 B1 | 8/2002 | Blank et al. |
| 6,568,578 B1 | 5/2003 | Kensrue |
| 7,026,575 B2 * | 4/2006 | Wimroither ............ 219/137.71 |
| 7,441,682 B2 * | 10/2008 | Kerekes et al. ................ 226/187 |
| 2005/0224550 A1 * | 10/2005 | Matiash ........................ 226/181 |

FOREIGN PATENT DOCUMENTS

| EP | 1 016 486 | 7/2000 |
| EP | 1016486 A1 * | 7/2000 ............. B23K 9/133 |
| JP | 6-029771 | 4/1994 |
| JP | 6-285635 | 10/1994 |
| JP | 10-085940 | 4/1998 |
| JP | 11314156 A * | 11/1999 ............. B23K 9/095 |
| WO | WO01/28728 | 4/2001 |
| WO | WO03/022501 | 5/2003 |

OTHER PUBLICATIONS

Japanese Office Action with English translation of same.

* cited by examiner

*Primary Examiner* — Henry Yuen
*Assistant Examiner* — Ayub Maye
(74) *Attorney, Agent, or Firm* — Collard & Roe, P.C.

(57) ABSTRACT

The invention relates to a device for transporting a welding wire (13), comprising at least one pair of rollers (55) consisting of drive roller (32) and a pressure roller (31) and a device (28) which is used to clamp a welding wire (13), in addition to a roller, in particular a drive roller (32), an intermediate piece (49), a threading device (74), a automatically centering device (80) and a device (85) which is used to detect the transportation speed of the welding wire (13). The pressure roller (31) is mounted in a pivotable pressure lever (29) in order to produce the most smallest, compact and easy to handle wire transporting device (27) possible and the clamping device (28) comprises a clamping bar (37) which can be connected to the pressure lever (29) in order to fix and pressurize.

55 Claims, 9 Drawing Sheets

DEVICE FOR TRANSPORTING A WELDING WIRE

CROSS REFERENCE TO RELATED APPLICATIONS

Applicant claims priority under 35 U.S.C. §119 of Austrian Application No. A 1166/2004 filed Jul. 9, 2004. Applicant also claims priority under 35 U.S.C. §365 of PCT/AT2005/000263 filed Jul. 11, 2005. The international application under PCT article 21(2) was not published in English.

The invention relates to a device for transporting a welding wire, including at least one roller pair comprised of a drive roller and a pressure roller, wherein the drive roller is coupleable with a drive motor, and a means for tensioning the welding wire.

The invention further relates to a roller, in particular drive roller, for transporting a welding wire, including a groove-shaped indentation and a bearing bore for the arrangement of a shaft in the center of the roller, in particular drive roller.

Furthermore, the invention relates to an intermediate piece for fastening to a shaft a roller for transporting a welding wire, including a base body capable of being slipped onto the shaft.

Moreover, the invention relates to a thread-in mechanism for a device for transporting a welding wire, including at least one roller pair comprised of a drive roller and a pressure roller, wherein the drive roller is coupleable with a drive motor, and a means for tensioning the welding wire.

In addition, the invention relates to a self-centering means for a roller pair comprised, in particular, of a drive roller and a pressure roller and used to transport a welding wire, wherein the rollers, in particular the drive roller and the pressure roller, include a groove for receiving the welding wire, and wherein a bearing bore is provided in the center of the drive roller and the pressure roller, via which the drive roller and the pressure roller are each arrangeable on a shaft or axle.

The invention further relates to a device for detecting the transport speed of the welding wire, including a housing preferably comprised of two parts and containing a rotary encoder including a roller fastened thereto, wherein the rotary encoder is in active connection with the welding wire.

Welding wire transport devices in which at least one roller pair, in particular at least one drive roller and at least one pressure roller, are used to transport a wire are known from the prior art. There, the roller, in particular the drive roller, is, for instance, mounted on a shaft and fixed to the shaft by a further fastening element. The pressure roller, for instance by elastic elements or specially arranged tension levers, is pressed against the drive roller and, with a welding wire inserted, also against the latter. Furthermore, the roller pair is fixed in its axial position, exhibiting little play. To facilitate the wire transport, grooves or indentations are, for instance, formed in the rollers. An additional roller pair may be used to detect the wire transport speed. It is, of course, also possible to detect the wire transport speed via the pressure roller. In that case, the welding wire will run between a roller detecting the circumferential speed and a further roller and/or a surface. The speed of the welding wire will be determined from the circumferential speed of the at least one roller.

The wire transport devices known from the prior art involve the drawback of having relatively large dimensions, for which reason welding torches with incorporated wire transport devices will be very large, thus considerably impeding the handling of the welding torch and also its accessibility. The mounting as well as replacement of the rollers of the wire transport device are, moreover, time-consuming and cumbersome. The roller pair is relatively fixed in its axial position and exhibits little play, whereby, due to manufacturing tolerances, relative tilts and/or shifts of the two rollers may occur such that the wire transport will be substantially complicated and the welding wire may possibly be deformed. When threading the welding wire into the wire transport device, at least one roller has to be turned away, pivoted away or pushed away. The wire is, thus, largely unguided during the thread-in procedure and may consequently slip out of its guide during threading in. By a possibly further roller pair provided for the detection of the wire transport speed, dimensions are further increased.

The object of the present invention, therefore, consists in providing a wire transport device which is as small and compact and readily handleable as possible, which operates reliably and which further excels by its cost-effective manufacture and maintenance.

Another object of the invention consists in providing a simple and reliable fixation of the rollers, in particular drive roller, of the wire transport device to a shaft.

Furthermore, conventional motors including simply designed shafts are to be usable for the drive of the rollers and different roller types are to be readily and rapidly attachable and replaceable without requiring any special adaptation of the shaft.

A further object of the invention resides in providing a tensioning system for the wire transport device, which is as small and compact as possible and suitable for any current welding torch.

The invention is, moreover, based on the object of enabling the welding wire to be threaded into the wire transport device without difficulty.

Furthermore, an automatic orientation of the rollers of the wire transport device relative to each other and to the central axis of the welding wire is to be feasible.

Finally, it is another object of the invention to provide a device for measuring the actual speed of the welding wire, which has a structural height as small as possible.

The first object according to the invention is achieved by an above-defined device for transporting a welding wire, wherein the pressure roller is mounted in a pivotable pressure lever and the tensioning means comprises a tension bracket capable of being connected with the pressure lever for fixation and pressure application. This will provide a wire transport device whose dimensions will be minimized so as to require only little space and, hence, be readily integratable in a welding torch.

A defined and optimized application of pressure on the welding wire, which will be reproducible upon opening and closing of the tensioning system, will be provided by the characteristic features of claims 2 to 5.

The characteristic feature of claim 6 enables the welding wire to run through the tensioning system so as to further reduce the space demand required for the wire transport device.

The configuration according to claims 7 to 10 is also advantageous, because it enables the adjustment of the pressure application and, hence, the adaptation of the pressure to the respectively employed welding wire. It is, moreover, possible to adjust a reproducible pressure on the welding wire.

The characteristic features according to claims 11 to 13 enable the pressure application to be readily performed in a single operating step.

By the characteristic features of claims 14 to 18, a simple mounting and simple exchange of the rollers is rendered feasible while, at the same time, ensuring the safe operation of the wire transport device.

If the bias of the spring element is changeable by a rotational movement of the tension bracket, it will be feasible to change or adjust the pressure or application force of the pressure roller on the welding wire in a simple manner.

By providing several pressure rollers on the pressure lever, which are preferably arranged on a rocker, the wire transport will be enhanced.

The object according to the invention is also achieved by an above-defined roller, in particular drive roller, which comprises a socket element and a means for fastening the roller to a shaft.

A configuration of the roller as in accordance with claims 22 and 23 is also advantageous, because the roller will thereby have an extended guide region on the shaft and the fastening means will also be arrangeable within the socket element.

The configuration according to claim 24 is also of advantage, because it enables the roller and the socket element to be directly fastened to the shaft without requiring any additional parts or elements. Moreover, the fabrication of the roller and socket element will be feasible in a simple manner.

The configuration according to claim 25 offers the advantage of ensuring the simple centering of the roller and/or socket element so as to ensure a precise wire transport.

By the configuration according to claims 26 and 27, it is ensured in an advantageous manner that the roller, and the groove-shaped indentation, will be protected during the installation or exchange of the roller, since the operating range, or range in which the tool for the roller exchange is applied, will be precisely defined. The use of a tool, moreover, enables the torque of the roller fixation to be precisely defined so as to enable a reproducible roller installation or reproducible roller exchange.

A configuration according to claims 28 and 29 is also of advantage, since it enables the shaft to be configured in a simple manner, with appropriate surfaces and/or threads being, moreover, arranged on the intermediate piece so as to allow a simple and cost-effective fabrication. Furthermore, it is of advantage that the flexibility in respect to the use of different roller types with an existing shaft will be increased, since in that case the intermediate piece will be exchangeable, yet without having to change the shaft.

A configuration according to claim 30 is also advantageous, because influence can thereby be taken on the transmission of force from the motor onto the roller and on the rotational speed of the roller.

The object of the invention is also achieved by an intermediate piece for the fastening of an above-described roller for transporting a welding wire, wherein the base body is designed in a sleeve-shaped manner with a slot being provided in the longitudinal direction of the base body, preferably over the entire length of the base body. This ensures in an advantageous manner the simple fixation of the intermediate piece to the shaft irrespectively of the shaft diameter.

A configuration according to claim 32 is of advantage in that a means known from the prior art is used to fasten the intermediate piece to the shaft and the intermediate piece is connected with the shaft in a force-locking manner, i.e. in a rotationally fast manner.

A configuration according to claim 33 in an advantageous manner enables the roller to be fastened to the intermediate piece in a simple manner.

Yet, also a configuration according to claim 34 is of advantage, since the ideal driving properties of the roller are thereby reached.

A configuration according to claim 35 is also advantageous, since it enables the automatic positioning of the roller and intermediate piece so as to ensure a precise wire transport.

A configuration according to claim 36 is also of advantage, since it provides simple mounting of the intermediate piece to the shaft.

A configuration according to claim 37 is advantageous too, because it enables the intermediate piece to be precisely positioned in the axial direction. Furthermore, this configuration offers the advantage of the end of the shaft being covered, and hence protected, by the intermediate piece.

The object of the invention is also achieved by a thread-in mechanism for a device for transporting a welding wire, wherein the pressure roller is mounted in a pivotable pressure lever and a spacer element is displaceably arranged such that, for the threading in of the welding wire, the distance between the drive roller and the pressure roller is adjustable in a manner that a defined distance of the rollers and/or a defined, reduced application force of the rollers relative to each other will be provided. It is thereby achieved in an advantageous manner that the threading in of the welding wire is feasible without completely removing one of the two rollers of the roller pair required for the wire transport. As a result, the welding wire will nevertheless be guided between the rollers and protected from swerving while, at the same time, being threadable into the wire transport device with little force.

Yet, also a configuration according to claim 39 is of advantage, since the rollers will thereby have a predefined distance relative to each other via a spacer element so as to substantially facilitate the thread-in procedure.

A configuration according to claims 40 to 43 is advantageous too, because it produces a small and compact wire transport device. Moreover, the distancation of the rollers relative to each other will be ensured by simple mechanical displacement.

Also of advantage is a configuration according to claims 44 and 45, since it enables the automatic and simple threading in of the welding wire into the wire transport device. It is, moreover, possible to control the thread-in procedure, for instance by a control device, and hence automatically change the distance of the rollers relative to each other.

The object of the invention is also achieved by a self-centering means of the above-defined kind, for a roller pair comprised, in particular, of a drive roller and a pressure roller and used to transport a welding wire, wherein at least one centering element is arranged on at least one roller so as to effect the mutual axial alignment of the rollers relative to each other, and of the rollers relative to the welding wire. It is thereby ensured in an advantageous manner that the rollers are precisely aligned relative to each other and to the wire axis so as to enable a precise wire transport. Furthermore, squeezing of the welding wire will be largely prevented.

A configuration according to claims 47 to 49 is also of advantage, because is ensures the centering of the rollers both relative to each other and to the axis of the welding wire while requiring little force.

A configuration according to claims 50 to 52 is also advantageous, since in that case only one of the two rollers of the roller pair is arranged to be displaceable and, hence, only one element will have to be displaced to reach the relative centration of the rollers.

Yet, also the configuration according to claim 53 is advantageous, since it enables a wire transport in accordance with the prior art.

A configuration according to claims 54 and 55 is also advantageous, since the centration will thereby be enhanced.

Moreover, the groove-shaped indentation, in particular groove, will be arrangeable in the rollers in a manner as to ensure the optimum wire transport.

The object of the invention is also achieved by a device for detecting the transport speed of the welding wire of the above-defined kind, wherein at least one slide element is provided for guiding the welding wire, which slide element is configured to exert and/or take up the application pressure between the welding wire and the roller of the rotary encoder. It is thereby ensured in an advantageous manner that the detection of the speed of the welding wire is performed by just one roller, with the counter-pressure being exerted by a slide element. As a result, the size of the measuring device can advantageously be kept very small so as to enable its arrangement, for instance, even in space-critical elements such as, e.g., a welding torch.

Yet, also a configuration according to claims 57 and 58 is of advantage, since the welding wire will thereby only be free-running directly on the location of the device for detecting the transport speed, so that swerving like, e.g., an undesired deflection will be largely prevented.

The configuration according to claims 59 to 61 is also advantageous, because the rotary encoder is thereby be pressed against the welding wire by a constant force. On the one hand, this will ensure the safe functioning, i.e. operation in a practically slip-free manner, of the rotary encoder. On the other hand, the device for detecting the transport speed will be applicable for different welding wire diameters without requiring any adaptations.

The configuration according to claims 62 and 63 is also of advantage in that is allows for the simple installation of the device.

If a gear is arranged between the roller and the rotary encoder, the resolution of the measured results will be readily enhanced.

A configuration according to claims 65 and 66 is also of advantage, since it enables the actual wire transport speed to be incorporated in the control circuit for the welding wire transport. It is, thus, for instance possible to detect a slip of the rollers and, in particular, the drive roller. It can, furthermore, be recognized whether a welding wire is present in, or has been threaded into, the wire transport device in order to enable, for instance, the automatic stop of the welding process at the end of the welding wire.

Configurations according to claims 67 to 69 are also advantageous, because they enable the roller of the rotary encoder to be adapted to the respectively employed welding wire in order to reduce or eliminate measuring errors of the device for detecting the wire transport speed. A roller having, for instance, a smooth surface can be universally employed for any wire diameter and wire shape, while different groove shapes and materials may improve the contact between the welding wire and the roller so as to minimize the slip of the roller.

Figure 1:
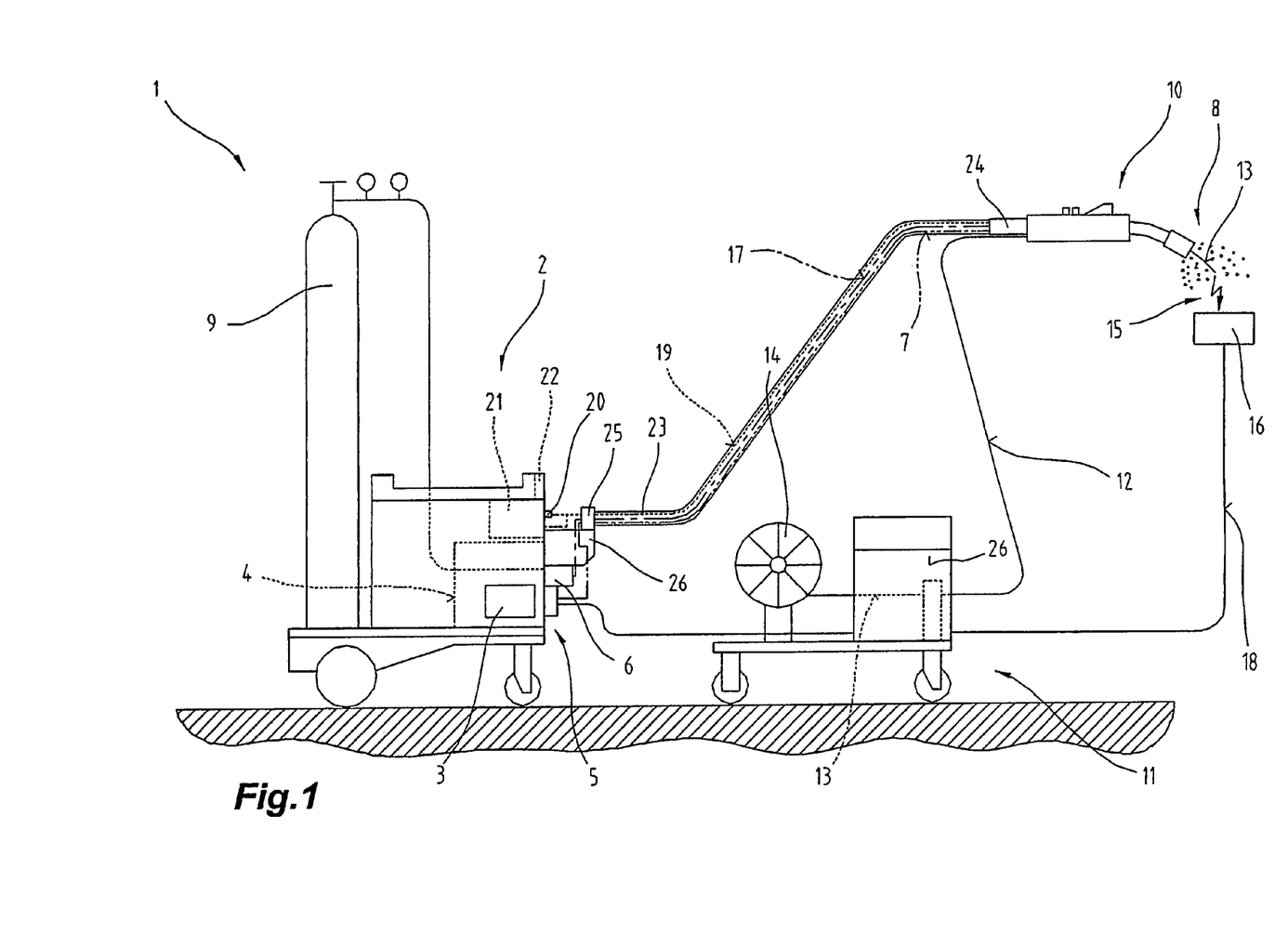
FIG. 1 is a schematic illustration of a welding machine or welding apparatus.

The present invention will be explained in more detail by way of the annexed drawings, which illustrate exemplary embodiments of the invention.
Therein:

FIG. 1 depicts a welding apparatus 1, or welding installation, for various processes or methods such as, e.g., MIG/MAG welding or WIG/TIG welding, or electrode welding methods, double-wire/tandem welding methods, plasma or soldering methods etc.

The welding apparatus 1 comprises a power source 2 including a power element 3, a control device 4, and a switch member 5 associated with the power element 3 and control device 4, respectively. The switch member 5 and the control device 4 are connected to a control valve 6 arranged in a feed line 7 for a gas 8, in particular a protective gas such as, for instance, carbon dioxide, helium or argon and the like, between a gas reservoir 9 and a welding torch 10 or torch.

In addition, a wire feeder 11, which is usually employed in MIG/MAG welding, can be controlled by the control device 4, whereby a filler material or welding wire 13 is fed from a feed drum 14 or wire coil into the region of the welding torch 10 via a feed line 12. It is, of course, possible to integrate the wire feeder 11 in the welding apparatus 1 and, in particular, its basic housing, as is known from the prior art, rather than designing the same as an accessory device as illustrated in FIG. 1. The wire feeder can also be configured for drum feeding. It is also feasible for the wire feeder 11 to supply the welding wire 13, or filler metal, to the process site outside the welding torch 10, to which end a non-consumable electrode is preferably arranged within the welding torch 10, as is usually the case with WIG/TIG welding.

The power required to build up an electric arc 15, in particular an operative electric arc, between the electrode or welding wire 13, respectively, and a workpiece 16 is supplied from the power element 3 of the power source 2 to the welding torch 10, in particular electrode, via a welding line 17, wherein the workpiece 16 to be welded, which is preferably formed by several parts, via a further welding line 18 is likewise connected with the welding apparatus 1 and, in particular, power source 2 so as to enable a power circuit for a process to build up over the electric arc 15, or a plasma jet formed.

To provide cooling of the welding torch 10, the welding torch 10 can be connected to a fluid reservoir, in particular a water reservoir 21, by a cooling circuit 19, for instance, via an interposed flow control 20, so as to cause the cooling circuit 19, in particular a fluid pump used for the fluid contained in the water reservoir 21, to be started as the welding torch 10 is put into operation, in order to effect cooling of the welding torch 10 by feeding a cooling medium.

The welding apparatus 1 further comprises an input and/or output device 22, via which the most different welding parameters, operating modes or welding programs of the welding apparatus 1 can be set and called, respectively. In doing so, the welding parameters, operating modes or welding programs set via the input and/or output device 22 are transmitted to the control device 4, which subsequently controls the individual components of the welding system or welding apparatus 1 and/or predetermines the respective set values for controlling.

In the exemplary embodiment illustrated, the welding torch 10 is, furthermore, connected with the welding apparatus 1 or welding system via a hose pack 23. The hose pack 23 houses the individual lines from the welding apparatus 1 to the welding torch 10. The hose pack 23 is connected with the welding torch 10 via a coupling mechanism 24, whereas the individual lines arranged in the hose pack 23 are connected with the individual contacts of the welding apparatus 1 via connection sockets or plug-in connections. In order to ensure an appropriate strain relief of the hose pack 23, the hose pack 23 is connected with a housing 26, in particular the basic housing of the welding apparatus 1, via a strain relief means 25. It is, of course, also possible to use the coupling mechanism 24 for connection to the welding apparatus 1.

It should basically be noted that not all of the previously mentioned components have to be used or employed for the various welding methods or welding apparatus 1 such as, e.g., WIG devices or MIG/MAG apparatus or plasma devices. Thus, it is, for instance, possible to devise the welding torch 10 as an air-cooled welding torch 10.

Figure 2:
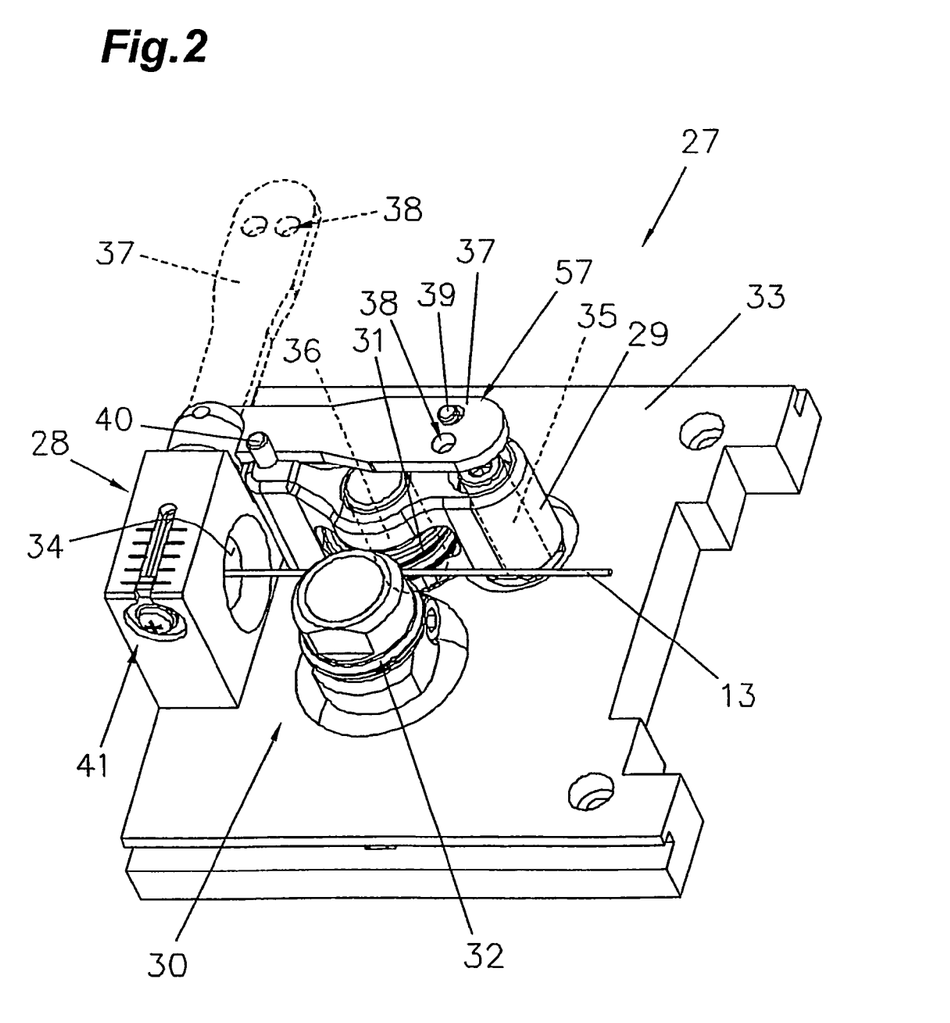
FIGS. 2 to 4 are different views of an embodiment of a device for transporting a welding wire according to the invention.
Figure 3:
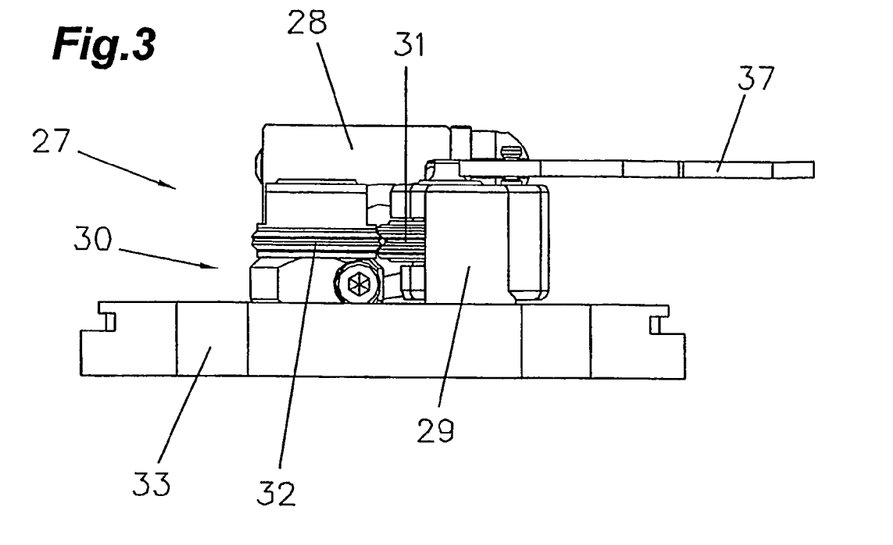
Figure 4:
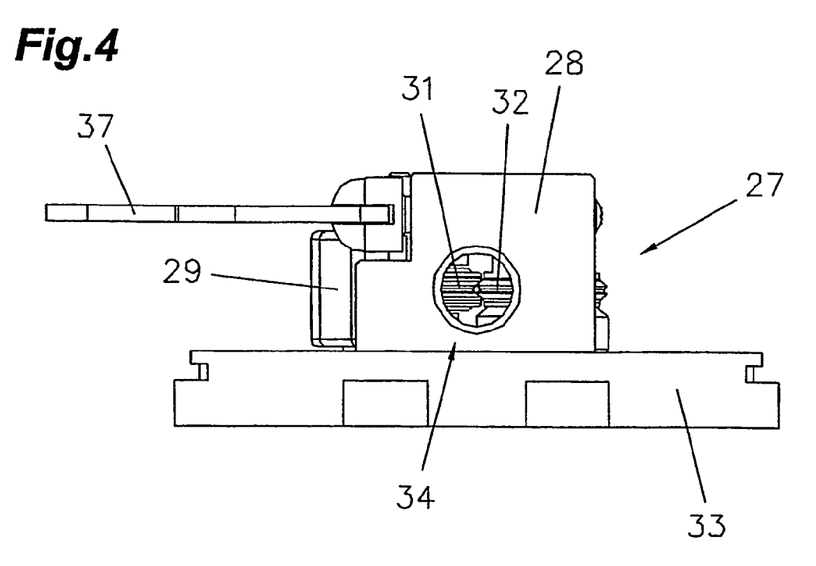

FIGS. 2 to 4 schematically illustrate, in a simplified view and in the assembled state, a wire transport device 27 feeding the welding wire 13 to the welding torch 10. The wire transport device 27 comprises a tensioning means 28, a pressure lever 29 and a slide shoe 30, wherein a pressure roller 31 is movably arranged within the pressure lever 29 and a drive roller 32 is arranged in or on the slide shoe 30. The tensioning means 28, the pressure lever 29 and the slide shoe 30 are, for instance, arranged on a mounting plate 33 and rigidly connected with the latter.

The wire transport device 27 functions in a manner that the welding wire 13, through a preferably round passageway 34 provided in the tensioning means 28, is guided to between the drive roller 32 and the pressure roller 31. The drive roller 32 is arranged in or on the slide shoe 30 and preferably driven by a motor (not illustrated). In order to be able to transport the welding wire 13 by the aid of the drive roller 32, the pressure roller 31 is rotationally arranged in the pressure lever 29 on the side of the drive roller 32 located opposite the welding wire 13. The pressure lever 29 is pivotably mounted via a pivot axis and, in particular, a guide pin 35 arranged in the mounting plate 33. The pressure roller 31 arranged in the pressure lever 29 is mounted to be movable, or rotational and displaceable, along a pin 36. The pin 36, or seat of the pin 36, is designed such that the pin 36 is readily removable for a roller exchange. The guide pin 35 is arranged in the end region or edge region of the pressure lever 29 in order to cover as large a radius as possible and, hence, as large a pivotal range as possible. This will ensure the safe transport of the welding wire 13.

In order to generate a pressure or application force on the welding wire 13 for the transport of the welding wire 13, the pressure lever 29 is pivoted via the guide pin 35 in the direction of the welding wire 13 until the pressure roller 31 arranged within the pressure lever 29 contacts the welding wire 13. In order to build up said pressure or application force on the welding wire 13 and maintain it subsequently, a tension bracket 37 pivotally mounted on the tensioning means 28 is pivoted in the direction of the pressure lever 29, which will then fix the pressure lever 29. To this end, the tension bracket 37 and the pressure lever 29 comprise at least one fixing means 57. The fixing means 57 can be formed by a bore 38 provided on the tension bracket 37 and into which a fixing pin 39 arranged on the pressure lever 29 is able to engage. The tension bracket 37 is, thus, connectable with the pressure lever 29 for fixation and pressure application. Moreover, a stop element 40 may be arranged on the pressure lever 29, on which stop element the tension bracket 37 will come to abut upon the application of pressure. With the welding wire 13 inserted, the pressure lever 29 and the pressure roller 31 arranged therein are pivoted in the direction of the welding wire 13, while a pressure is being applied on the welding wire 13 through the tension bracket 37. The welding wire 13 is, thus, transported by the friction forming between the welding wire 13 and the rotating rollers, in particular drive roller 32 and pressure roller 31.

In order to be able to adjust the pressure or application force on the welding wire 13, a pressure adjusting means 41 is advantageously provided. In the event of different welding wire 13s, an adjustment to the respective welding wire 13 and, in particular, diameter and material of the welding wire 13 can thus be effected. The pressure adjusting means 41 is preferably arranged above and/or below the welding wire 13 and, in particular, transversely to the welding wire 13.

The exact mode of functioning of the individual elements of the wire transport device 27 will be elucidated in the following Figures.

Figure 5:
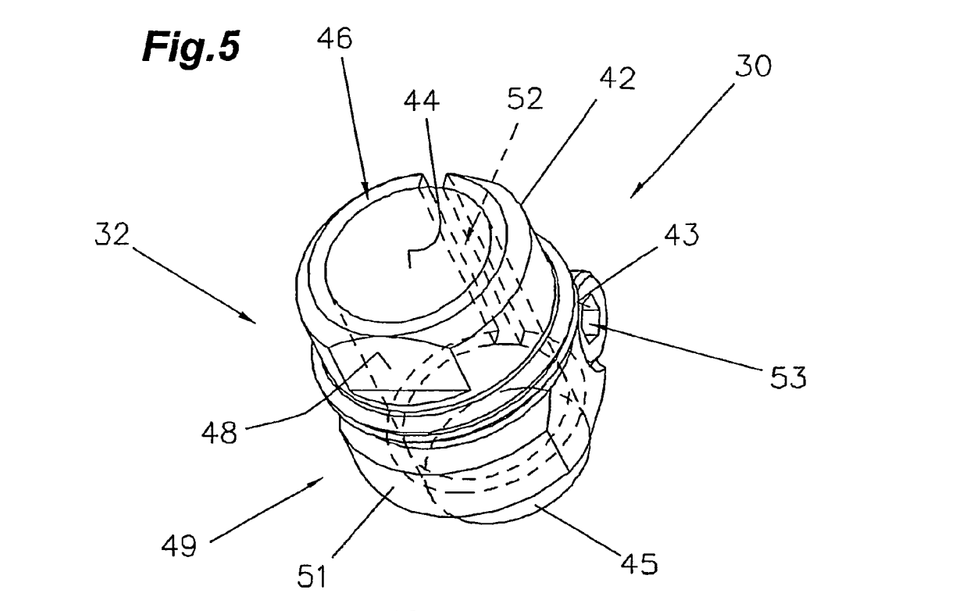
FIG. 5 is a perspective view of a drive roller with an attached intermediate piece.
Figure 6:
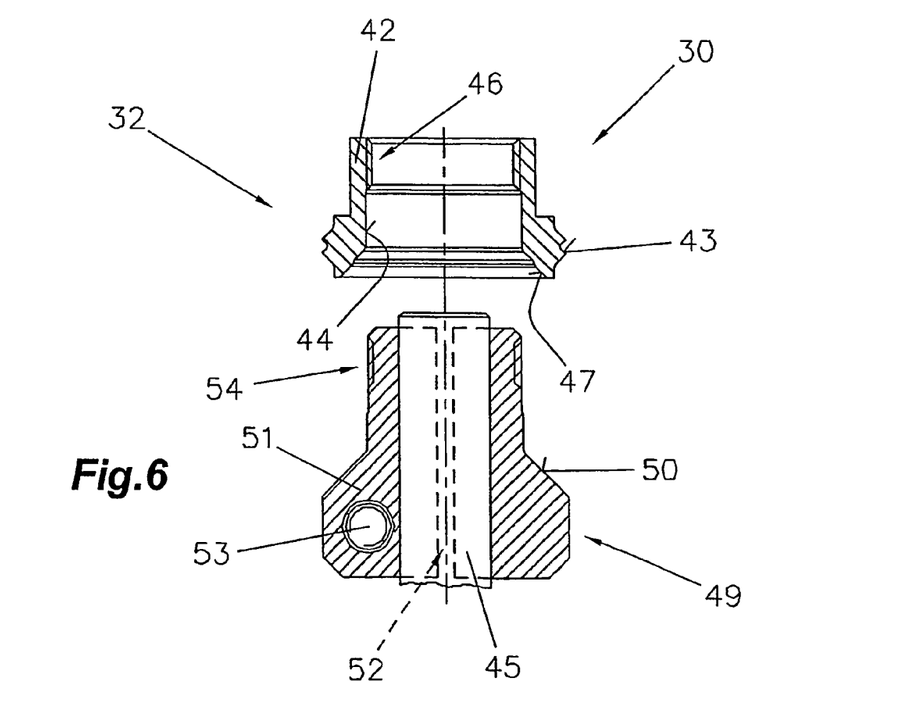
FIG. 6 is a sectional illustration through the drive roller and the intermediate piece according to FIG. 5.

FIGS. 5 and 6 depict a drive roller 32 with a socket element 42 and an intermediate piece 49.

The drive roller 32 in this case comprises a groove-shaped indentation 43 extending about the circumference of the drive roller 32 and serving the guidance and transport of the welding wire 13 as well as the transmission of force onto the welding wire 13. In the center of the drive roller 32, or socket element 42, a bearing bore 44 extending through the socket element 42 is further provided, which is designed as a recess and via which the drive roller 32, or socket element 42, is positionable on a shaft 45. In addition, the socket element 42 includes an internal thread 46, which is, for instance, provided in the interior of the socket element 42, i.e. within the bearing bore 44. On the side of the socket element 42 and/or drive roller 32 located opposite the internal thread 46, at least one centering surface 47 of preferably conical configuration is arranged. At least one stop surface 48, which is preferably designed as a planar surface, may moreover be arranged on the outer side of the socket element 42.

The socket element 42 can be screwed onto a corresponding thread by its internal thread 46. In order to ensure the centering of the socket element 42 with respect to the shaft 45, and/or an element arranged between the shaft 45 and the socket element 42, for instance an intermediate piece 49, the centering surface 47 is provided on the socket element 42. On the shaft 45 and/or intermediate piece 49 is also provided a centering surface 50, thus causing the mutual contact of the centering surfaces 47, 50 as the socket element 42 is screwed onto the shaft 45 and/or intermediate piece 49 and the automatic centering as well as the clamping of the socket element 42 on the shaft 45 and/or intermediate piece 49 by the conical configuration of the centering surfaces 47, 50. The socket element 42 can be screwed on by the aid of a tool or even manually using the stop surface 48. In doing so, it is necessary that the torque for fastening the drive roller 32 is larger than the force which would cause the detachment of the drive roller 32 from the intermediate piece 49 during the wire transport. By the stop surface 48 being arranged on the opposite side of the drive roller 32, easy accessibility to the stop surface 48 by the aid of a tool will be ensured. The drive roller 32 and, in particular, the indentation 43 will consequently not be damaged during the installation or exchange of the drive roller 32. Besides, such an arrangement will allow for the simple and quick installation or exchange of the drive roller 32.

The intermediate piece 49 according to the invention can be designed in a sleeve-shaped manner and pushed over the shaft 45.

In this case, the intermediate piece 49 comprises a slot 52 extending in the longitudinal direction of a base body 51 of the intermediate piece 49, said slot preferably extending over the total length of the base body 51. The intermediate piece 49 is slipped or pushed onto the shaft 45. Furthermore, an element 53 for fastening the intermediate piece 49 to the shaft 45 is arranged on the base body 51 of the intermediate piece 49. By actuating the fastening element 53, the slot 52 is compressed so as to provide a frictional engagement between the intermediate piece 49 and the shaft 45, and hence the rotationally fast connection of the intermediate piece 49 with the shaft 45. In the exemplary embodiment illustrated, the element 53 is designed as a screw connection. The intermediate piece 49 is, thus, contracted by a rotation of the element 53 and connected with the shaft 45. It is, of course, also possible to realize the element 53 in any other way, for instance by a continuous thread arranged in the intermediate piece 49 normally to the shaft 45, into which a screw, e.g. a headless screw, is screwed until contacting the shaft 45. Furthermore, an eccentric may also be used to compress the slot 52 at a rotation due to the eccentric arrangement in order to provide the rotationally fast connection of the intermediate piece 49 with the shaft 45. Naturally, any system known from the prior art can be used for the rotationally fast attachment of the intermediate piece 42 on the shaft 45. An attachment of the drive roller 32 to the shaft 45 is thus feasible in a simple manner. The position of the drive roller 32 on the shaft 45 is readily changeable, since only the element 53 of the intermediate piece 49 need be detached and the intermediate piece 49 will again be fastened to the shaft 45 after having reached the desired position. In doing so, the fastening moment is advantageously chosen such that a press fit will be reached between the shaft 45 and the intermediate piece 49.

In order to enable a simple installation of the intermediate piece 49, at least one centering and/or planar surface (not illustrated) can be arranged on the base body 51, particularly on the inner face of the base body 51. The intermediate piece 49 can, thus, be slipped in a rotationally fast manner onto the shaft 45, which will then likewise have to have a centering and/or planar surface, and be fastened by the element 53 only after having reached the desired position. In this respect, it is furthermore possible to configure the centering and/or planar surface of the shaft 45 in a manner that the centering and/or planar surface extends along the shaft 45 only to such an extent that the intermediate piece 49 merely needs to be pushed on and will stop at the end of the centering and/or planar surface with the desired position, in particular the necessary operating level of the drive roller 32, having been reached automatically.

A thread and, in particular, an external thread 54 may be provided on the intermediate piece 49, or base body 51 of the intermediate piece 49, on the opposite side of element 53. Onto this external thread 54 is threaded the socket element 42 of the drive roller 32 by means of the corresponding internal thread 46. A means for fastening the drive roller 32 to the shaft 45 is, thus, formed by the internal thread 46 of the socket element 42 and the external thread 54 of the intermediate piece 49. The centering surface 50 is arranged between the external thread 54 and the element 53. The socket element 42 is screwed onto the intermediate piece 49 until the centering surface 47 of the socket element 42 and the centering surface 50 of the intermediate piece 49 contact each other. By tightening the socket element 42 on the intermediate piece 49 with a defined torque, a rotationally fast connection between the socket element 42 and the intermediate piece 49 is reached.

The base body 51 of the intermediate piece 49 is formed on the outer side as a molded part for fastening by the aid of a tool and/or by hand. This may be realized by at least one stop surface 48, which is designed as a planar surface to be engaged by a tool. The simple and safe installation of the intermediate piece 49 and the simple exchange of the drive roller 32 are thereby ensured.

The shaft 45 in an advantageous manner is directly connected with a drive, in particular an electromotor, which drive may be formed by any known drive (not illustrated). It is, of course, also possible to arrange a gear between the shaft 45 and the drive or motor to thereby provide, for instance, a reduction or increase in order to enable the use of a smaller motor, for instance, for the same transport speed.

The base body 51 of the intermediate piece 49 may be directly connected with the shaft 45. It is, of course, also possible to arrange the base body 51 on the shaft 45 of a drive, in particular drive motor, via an interposed gear.

Figure 7:
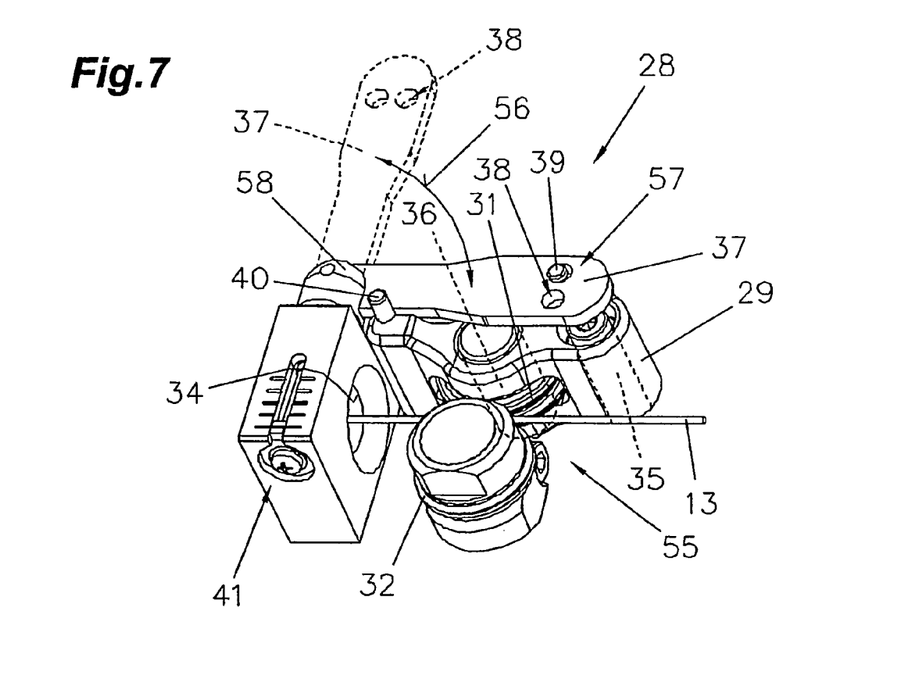
FIG. 7 is a perspective view of an embodiment of a tensioning system according to the invention.
Figure 8:
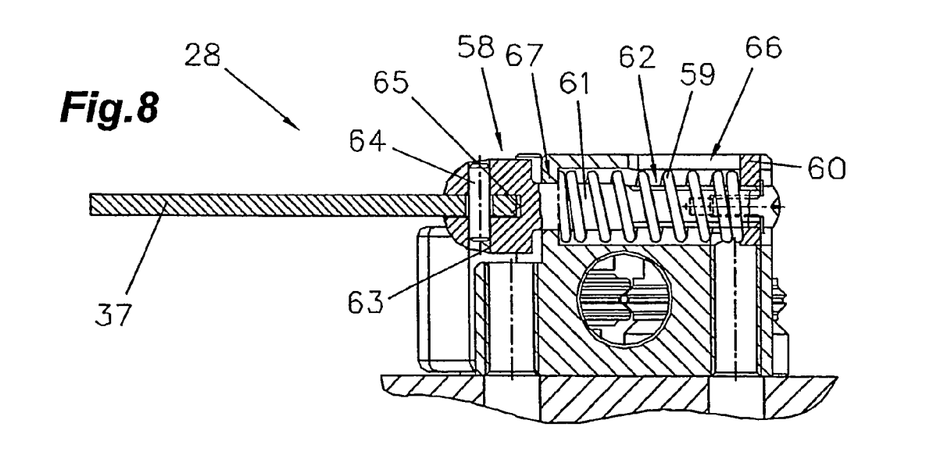
FIG. 8 is a sectional view through the tensioning system according to FIG. 7.

FIGS. 7 and 8 depict an embodiment of a tensioning system 28 according to the invention in a simplified, schematic illustration. The tensioning system 28 comprises at least one roller pair 55 comprised of a drive roller 32 and a pressure roller 31. The drive roller 32 is connected with a drive motor as described by way of FIGS. 5 and 6. The pressure roller 31 is mounted in a pivotable pressure lever 29 and pressed onto the welding wire 13 by the aid of the tensioning means 28. The tensioning means 28 comprises the tension bracket 37 for fixation and pressure application, which is connectable with the pressure lever 29. The tension bracket 37 is mounted on the tensioning means 28 in a movable, particularly pivotable or rotational, manner. The tension bracket 37 is, for instance, pivotable about an angle 56 ranging, for instance, between 70° and 110°.

The tension bracket 37 and the pressure lever 29 comprise a fixing means 57 to maintain the pressure exerted on the welding wire 13 by the tension bracket 37 and the pressure lever 29 via the pressure roller 31. The fixing means 57 in this case is formed by at least one bore 38 provided on the tension bracket 37, however, in particular two bores 38, and a corresponding fixing pin 39 arranged on the pressure lever 29. The fixing pin 39 may, of course, also be arranged on the tension bracket 37, which will then engage in at least one bore 38 provided on the pressure lever 29. Furthermore, a stop element 40 is arranged on the pressure lever 29, on which stop element the tension bracket 37 will abut upon fixation.

The tensioning means 28, moreover, comprises a pressure adjusting means 41, which is advantageously arranged above and/or below the welding wire 13, particularly transversely to the welding wire 13. The pressure adjusting means 41 may be comprised of a tie rod 58, a spring element 59 and an adjustment disc 60. The tie rod 58 is formed by an elongated base body 61, with the tension bracket 37 being pivotally mounted on one side of the base body 61 and a thread 62 being arranged on the opposite side of the base body 61. To mount the tension bracket 37 on the tie rod 58, the tie rod 58 comprises a bearing bore 63 into which a bearing pin 64 is inserted. Normally to the bearing bore 63 is arranged a recess 65, into which the tension bracket 37 will then be inserted. After the insertion of the tension bracket 37 into the recess 65, the bearing pin 64 is pushed into the bearing bore 63 of the tie rod 58 and through a bore in the tension bracket 37 so as to enable the mounting of the tension bracket 37. The bearing bore 63 and the mounting pin 64 are configured in a manner that the bearing pin 64 is pressed into the bearing bore 63. It is, therefore, possible to remove or exchange the bearing pin 64 by knocking out the bearing pin 64 using a tool, for instance a drift punch. Due to the press fit of the bearing pin 64 in the bearing bore 63, the former will be secured against falling out.

The tie rod 58 is arranged in a recess 66 provided in the tensioning means 28, which is only negligibly larger than the tie rod 58 over a short distance along the opening 67 and substantially larger than the tie rod 58 following this distance. A short guide surface is, thus, produced in the recess 66 for the tie rod 58. The adjustment disc 60 is screwed onto the thread 62 of the tie rod 58, or base body 61 of the tie rod 58. The spring element 59 is arranged between the adjustment disc 60 and the slightly larger opening 67 of the recess 66. The tie rod 58 is, thus, resiliently mounted in the tensioning means 28 by means of the pressure spring 59, which is supported on the tensioning means 28 and the adjustment disc 60. In order to reach an adjustment of the spring pressure of the pressure spring 59, it will do to turn the adjustment disc 60 on the tie rod 58 forwards or backwards. By turning the adjustment disc 60 in the direction of the opening 67, the pressure spring 59 is being compressed, thus causing a larger force to act on the tie rod 58. It is, of course, also possible to position the adjustment disc 60 on the tie rod 58 in a movable, i.e. displaceable, manner, yet the adjustment disc 60 is arranged within the tensioning means 28 in the longitudinal direction of the thread 62 of the tie rod 58. Consequently, the bias of the spring element 59 can, for instance, be changed by a rotational movement of the tension bracket 37. This enables the adjustment of the pressure or application force for the pressure roller 31.

In order to secure the adjustment disc 60 from eventually falling down if turned back too much from the tie rod 58, a screw element 68 may, for instance, be arranged on the opposite side of the bearing pin 64, which may, for instance, be designed as a hexagon socket screw. The user of the adjustment disc 60 will, thus, only be able to turn the adjustment disc 60 back as far as to the screw element 68 so as to prevent it from falling down from the tie rod 58, which constitutes a simple way of securing the adjustment disc 60.

The adjustment disc 60 may be designed as an indicator for reading off the application pressure exerted by the pressure roller 31 on the welding wire 13. The preadjusted pressure or application force exerted by the pressure roller 31 on the welding wire 13 can, thus, be read off on a scale as a function of the position of said indicator.

The tension bracket 37 presses on the pressure lever 29, thus causing the pressure roller 31 to exert a pressure force on the welding wire 13. The pressure lever 29 has a pivot axis which is formed by the guide pin 35 via which the pressure lever 29 is rotationally mounted on a housing or on the mounting plate 33. The pivot axis or guide pin 35 is arranged in the end region or edge region of the pressure lever 29, in particular in the region of the fixing pin 39. Thus, less pressure force is required by the tension bracket 37 and the latter can be made substantially-smaller. The tensioning system 38 and, hence, also the wire transport device 27 are, thus, more easily arrangeable within a welding apparatus 1 and/or the welding torch 10 and/or the hose pack 23.

Figure 9:
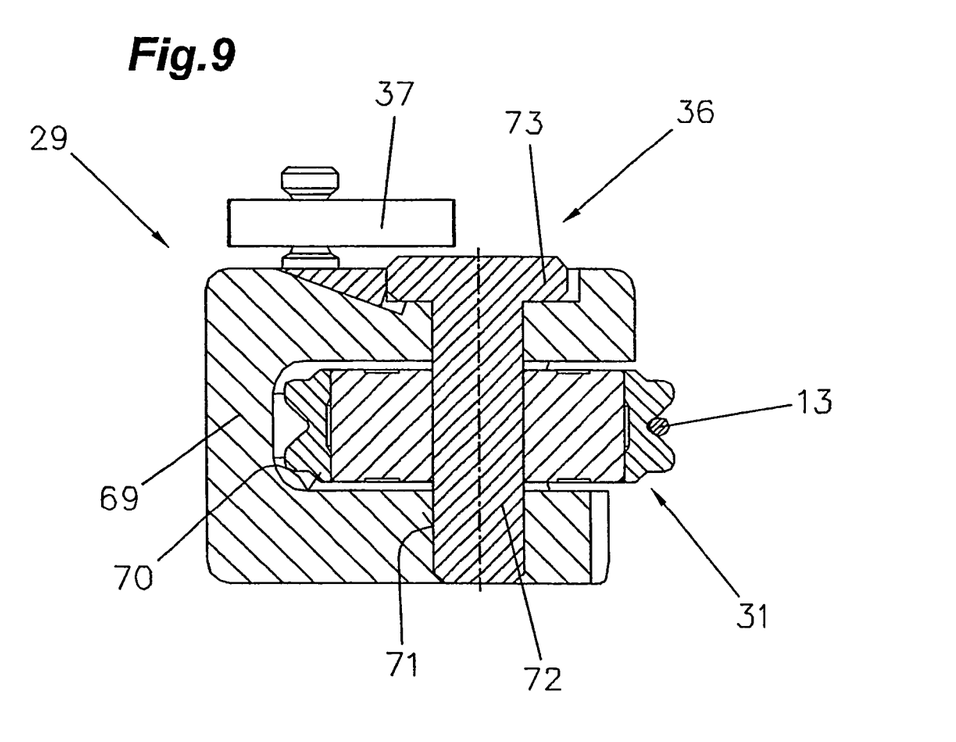
FIG. 9 is a sectional view through a portion of a wire transport device in the region of the pressure roller.

In FIG. 9, the arrangement of the pressure roller 31 in or on the pressure lever 29 is schematically illustrated in a simplified manner. In order to enable a simple and uncomplicated exchange of the pressure roller 31, the pin 36 is removable from the pressure lever 29 for a roller exchange. The pressure lever 31 is comprised of a base body 69 provided with a recess 70. A seat 71, into which the pin 36 is inserted, is arranged normally to the recess 70, wherein, with the pressure roller 31 inserted, the pin 36 mounts the pressure roller 31 in the pressure lever 29, or base body 69 of the pressure lever 29.

The pressure roller 31 is, thus, arranged in the central region of the pressure lever 29. The pressure roller 31 is arranged on the pin 36 so as to be rotational and movable in the axial direction of the pin 36. The pin 36 is formed by an elongated guide body 72 and a pin head 73, said pin head 73 having a larger diameter than the guide body 72 such that the pin 36 is held by the pin head 73 within the seat 71 after having been inserted from above. At an exchange of the pressure roller 31, it will, thus, do to merely pull the pin 36 out of the seat 71.

Since the pin 36 sits snugly, and is retained, in the seat 71 of the pressure lever 29 merely by gravity, at least part of the pin 36 is preferably covered by the tension bracket 37 with the tension bracket 37 fixed on the pressure lever 29, so as to prevent an undesired longitudinal movement of the pin 36.

It is, of course, also possible to arrange several pressure rollers 31 in or on the pressure lever 29, said pressure rollers 31 being, for instance, arrangeable on a rocker in order to achieve a constant pressure force on the welding wire 13.

Figure 10:
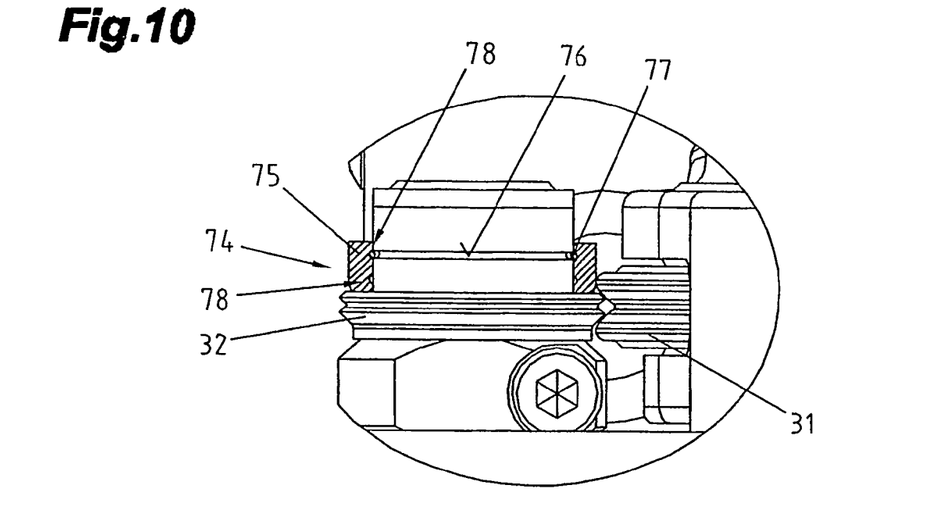
FIGS. 10 and 11 are simplified, schematic illustrations of an embodiment of a thread-in mechanism for a wire transport device.
Figure 11:
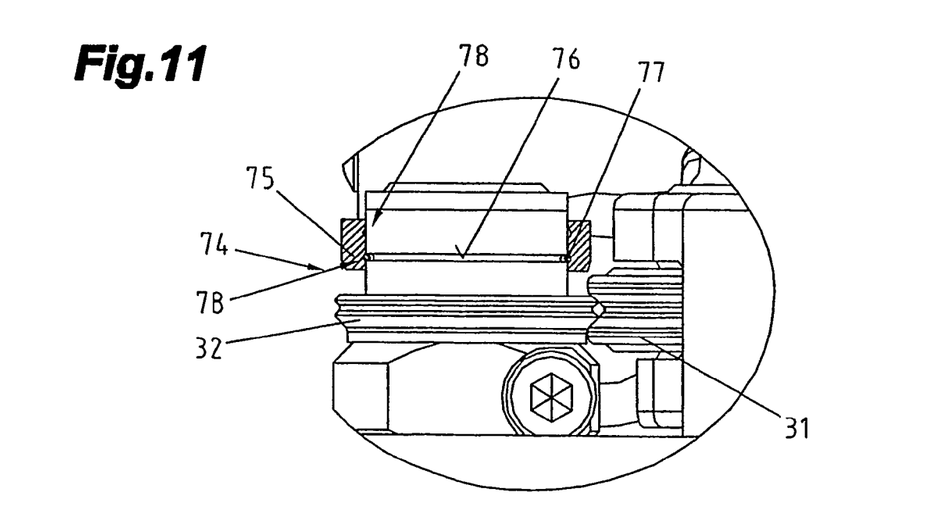

FIGS. 10 and 11 schematically illustrate a thread-in mechanism 74 in a simplified manner. These are detailed views of the wire transport device 27 according to the invention. To facilitate the thread-in procedure into the wire transport device 27, an adjustable spacer element 75 is provided, which provides a defined distance and/or a defined, reduced application force of the rollers, in particular of the drive roller 32 and the pressure roller 31, relative to each other. By the aid of the spacer element 75, the application force can be reduced to a defined value during the thread-in procedure.

The spacer element 75 is arranged between the rollers 31 and 32 and/or their socket elements 42. Via the contour of the spacer element 75, the defined distance necessary for the respectively employed welding wire 13 between the rollers 31, 32 is adjusted. The spacer element 75 is designed in a manner that the drive roller 32 and the pressure roller 31 will be at a relative distance that is necessary for the inserted welding wire 13. Substantially simplified threading in of the welding wire 13 is, thus, ensured in a simple manner.

The socket element 42 of the drive roller 32 comprises a groove 76 extending about the periphery of the socket element 42. An O-ring 77 is, for instance, arranged in said groove 76. Two indentations 78 arranged in a defined, spaced-apart relationship are provided in the spacer element 75. The spacer element 75 is arranged to be displaceable in the longitudinal direction via a bearing axis of the rollers 31, 32. As one of the two indentations 78 of the spacer element 75 reaches the O-ring 77, the spacer element 75 snaps in automatically. In the position of the spacer element 75 illustrated in FIG. 11, an operating position in which the two rollers 31, 32 contact each other is adjusted. With the welding wire 13 inserted, the latter would consequently be transported at a predefined application pressure and a thread-in procedure would only be very difficult to perform. In the position according to FIG. 10, the pressure roller 31 is pushed away from the drive roller 32 by the spacer element 75 so as to allow for the simple threading in of the welding wire 13 into the wire transport device 27.

The spacer element 75 is pushed downwards along the socket element 42 until the upper indentation 78 of the spacer element 75 engages the O-ring 77. The spacer element 75 then presses the pressure roller 31 arranged in the pressure lever 29 away from the drive roller 32. The welding wire 13 can, thus, be readily threaded in. The spacer element 75, or diameter 79 of the spacer element 75, is chosen such that the welding wire 13 can be easily threaded into the wire transport device 27 and thread-in mechanism 74, respectively.

It is, of course, also possible to design the spacer element 75 as an eccentric, whereby a distance of the rollers 31, 32 relative to each other and/or a reduced application force of the pressure roller 31 to the drive roller 32 will be provided by a rotation of the spacer element 75. It would, moreover, be possible to make the spacer element 75 elastically deformable in the manner of a balloon, with a regulation of the application pressure being obtainable by a change of the volume of the spacer element 75. The spacer element 75 can naturally also have a conical configuration, whereby the rollers will again be pressed apart upon displacement of the spacer element 75 so as to facilitate the threading-in of the welding wire 13.

The spacer element 75 can also be connected with an automatic adjustment means, for instance the control device 4 of the welding apparatus 1, and automatically adjusted to the employed welding wire 13 by the control device 4. To this end, it will do to define the welding wire 13 employed, or to be employed, and enter it into the control device 4.

The spacer element 75 is advantageously connected with the drive roller 32, or socket element 42 of the drive roller 32.

Figures 12, 13, 14, 15:
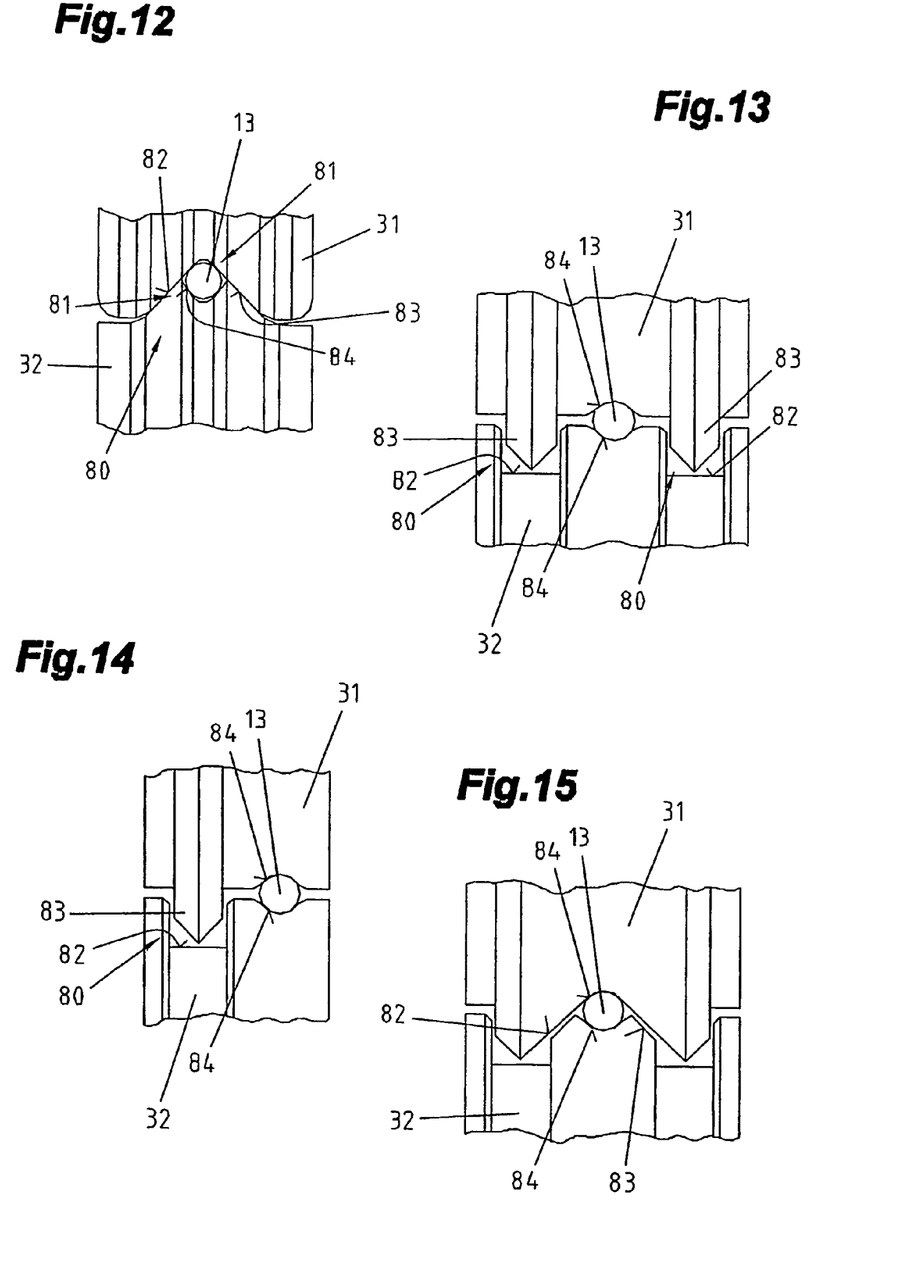
FIGS. 12 to 15 depict various embodiments of a self-centering means for a roller pair comprised of a drive roller and a pressure roller and used to transport a welding wire.

FIG. 12 in a simplified, schematic illustration depicts a variant embodiment of a self-centering means 80 for a roller pair comprised, in particular, of a drive roller 32 and a pressure roller 31, and used to transport a welding wire 13. The rollers 31, 32 comprise at least one centering element 81 which ensures the mutual axial alignment of the rollers 31, 32 relative to each other, and of the rollers 31, 32 relative to the welding wire 13, during the closing procedure of the pressure lever 29.

The centering element 81 is formed on one of the rollers, in particular the pressure roller 31, as a preferably funnel-shaped indentation 82. The pressure roller 31 is mounted so as to be displaceable along the axis of the pressure roller 31, i.e. the pin 36. In the other one of the rollers, in particular drive roller 32, the centering element 81 is designed as a V-shaped projection 83 additionally comprising a groove 84. The roller with the projection 83, i.e. the drive roller 32, is rigidly connected with the shaft 45. Since the V-shaped indentation 82 provided on the pressure roller 31 is designed to correspond with the V-shaped projection 83, the centering of the rollers 31, 32 relative to each other is ensured in a simple manner. The pressure roller 31 is, thus, centered relative to the drive roller 32 and welding wire 13, respectively. The pressure roller 31 likewise comprises, in particular in the funnel-shaped indentation 82, a groove 84 in which the welding wire 13 extends. One of the two rollers, in particular the roller comprising the projection 83, i.e. the drive roller 32, is connected with the drive motor via the shaft 44 and/or a gear.

The following FIGS. 13 to 15 depict further variant embodiments of the self-centering means 80 in a simplified, schematic illustration.

It is thus possible to arrange the V-shaped projection 83 on the pressure roller 31 and to provide the indentation 82 corresponding with the V-shaped projection 83 on the drive roller 32. It is, moreover, possible to mount the drive roller 32 in a manner displaceable along the axis of the drive roller 32, i.e. along the shaft 45, and to rigidly connect the pressure roller 31 with the pin 36.

Furthermore, the centering element 81 can be arranged to be laterally offset relative to the groove 84, which means that the groove 84 need not necessarily be provided in or on the centering element 81. Thus, also several centering elements 81, for instance two centering element 81, can be provided, with the groove 84 for the welding wire 13 being arranged between said centering elements 81. Naturally, the groove 84 for the welding wire 13 may also be integrated in the centering element 81 of one of the two rollers 31, 32, with the further centering element 81 of the other roller 32, 31 being formed without a groove.

Figure 16:
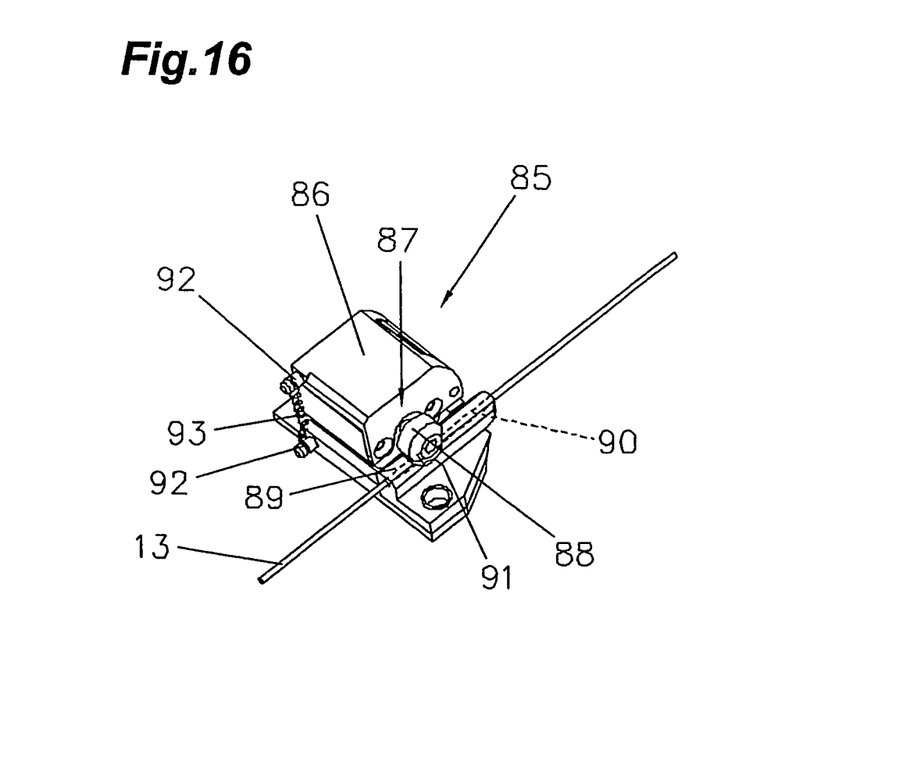
FIGS. 16 and 17 depict various views of an embodiment of a device for detecting the transport speed of a welding wire.
Figure 17:
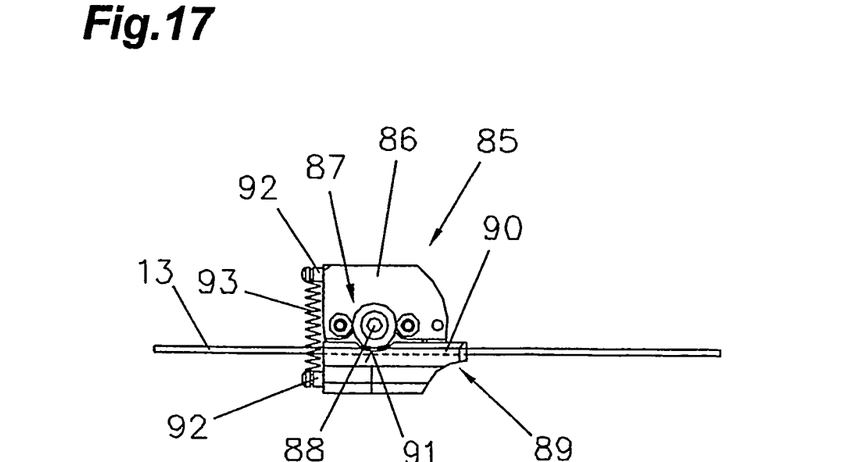

In FIGS. 16 and 17, a device 85 according to the invention for detecting the transport speed of the welding wire 13 is schematically illustrated in a simplified manner.

The device 85 is comprised of a housing 86 or holding means, in which a rotary encoder 87 with an attached roller 88 is arranged. The device 85, i.e. the housing 86 with the rotary encoder 87, is, for instance, arranged in a welding apparatus 1 and/or a wire feeder 11 and/or a welding torch 10. The rotary encoder 87 of the device 85 for detecting the transport speed of the welding wire 13 is in active connection with the welding wire 13 via the roller 88. The roller 88 is set in rotation by the welding wire 13 and the rotational movement of the roller 88 is taken up by the rotary encoder 87. The wire transport speed can, thus, be detected in a simple manner.

It is, of course, also possible to arrange several detection devices 85 in order to enable an enhanced detection of, for instance, deviations of the wire transport speed. Thus, the slip of the rollers, in particular drive roller 32 and pressure roller 31, might be detected. To this end, it is, moreover, possible to arrange a gear between the roller 88 and the rotary encoder 87 to regulate the gear ratio. The rotary encoder 87 in this case is connected with the control device 4 of the welding apparatus 1 or welding installation and/or with a wire transport control device. This allows for automatic responses to possible deviations of the wire transport speed and the appropriate control of the wire transport device 27.

Furthermore, a slide element 89, which forms a passageway 90 for the welding wire 13, is arranged on the detection device 85, or on part of the same. On the slide element 89 is formed a recess 91 which is designed such that the roller 88 of the rotary encoder 87 is able to engage the recess 91 and, with the welding wire 13 inserted, contacts the same. The recess 91, thus, extends at least as far as to the passageway 90 for the welding wire 13. In order to ensure an enhanced contact of the roller 88 with the welding wire 13, it is, however, necessary to form the recess 91 preferably as far as to the center of the passageway 90 for the welding wire 13.

The housing 86 of the device 85 is preferably comprised of at least two parts such that the rotary encoder 87 can be easily inserted into the housing 86 with the housing 86 opened, whereupon both parts of the housing are closed. In a preferred manner, the housing 86, or the two parts of the housing 86, are configured such that the rotary encoder 87 projects out of the housing 86 along with the roller 88 and is protected from possible contamination. The rotary encoder 87 is preferably rigidly connected with at least one part of the housing 85 and mounted, in particular resiliently mounted, so as to be movable relative to the other part of the housing 86. The two parts of the housing 86, moreover, comprise projections 92 to which a spring 93 may be attached. The two parts of the housing 86 can, thus, be closed, and subsequently held closed, by the spring 93.

The roller 88 may, for instance, comprise a groove for the welding wire 13 such that the welding wire 13 is guided by the roller 88 during the detection of the transport speed. Due to the recess 91, the welding wire 13 is, in fact, unguided in the region in which the roller 88 contacts the welding wire 13 and can only be guided, for instance, by slide elements 89 arranged on either side, or the groove provided in the roller 88. The roller 88 need not necessarily have a groove for the welding wire 13, but may also be designed to be smooth on its surface. In order to reach as small a slip as possible of the roller 88 relative to the welding wire 13, the roller 88 may be made of a material with low slip properties as compared to the material of the welding wire 13.

It is, furthermore, possible to arrange, for instance, an electrical contact element in the two parts of the housing 86 in order to only recognize with the housing closed, whether or not a welding wire 13 extends through the housing 86 and is, hence, either activated or deactivated, respectively. The device 85 for detecting the transport speed of the welding wire 13 can, thus, be shut off with no welding wire 13 present, and activated with a welding wire 13 inserted.

The invention claimed is:

1. A device for transporting a welding wire, the device including:
    at least one roller pair comprising a drive roller and a pressure roller, wherein the drive roller is coupleable with a drive motor, and
    a tensioning device for tensioning the welding wire,
    wherein the pressure roller is mounted in a pivotable pressure lever, and
    wherein the tensioning device comprises:
        a tension bracket capable of being connected with the pressure lever for fixation and pressure application,
        an adjuster for adjusting the application pressure exerted by the pressure roller on the welding wire, the adjuster being arranged above, below, or above and below the welding wire and transversely to a conveyance direction of the welding wire, the adjuster comprising a tie rod, a spring element, and an adjustment disk, and the tension bracket being pivotally or rotationally connected with the tie rod, and
        a passageway for the passage of the welding wire,
    wherein the tension bracket and the pressure lever comprise a fixing device,
    wherein said fixing device is formed by:
        at least one bore provided on the tension bracket or on the pressure lever, and
        a corresponding fixing pin provided on the pressure lever or on the tension bracket, respectively, and engageable in the at least one bore,
    wherein the pressure lever has a pivot axis and the pressure lever is fastened to a housing or mounting plate so as to be rotational about the pivot axis, and
    wherein the pivot axis is arranged in an end region or an edge region of the pressure lever in a region of the fixing pin.

2. The transport device according to claim 1, wherein a stop element is arranged on the pressure lever for abutment of the tension bracket upon fixation to the pressure lever.

3. The transport device according to claim 1, wherein the adjustment disc is designed as an indicator for reading off application pressure on a scale.

4. The transport device according to claim 1, wherein the pressure roller is mounted to rotate via a pin provided in the pressure lever.

5. The transport device according to claim 1, wherein a bias of the spring element is changeable by a rotational movement of the tension bracket and, hence, pressure or application force exerted by the pressure roller on the welding wire is adjustable.

6. The transport device according to claim 1, further comprising a plurality of second pressure rollers on the pressure lever.

7. The transport device according to claim 1, wherein at least one of the drive roller and the pressure roller further comprises:
    a groove-shaped indentation and a bearing bore for arrangement of a shaft in a center of the at least one of the drive roller and the pressure roller, and
    a socket element and a fastener for fastening the at least one of the drive roller and the pressure roller to the shaft.

8. The transport device according to claim 1, further comprising an intermediate piece for fastening at least one of the drive roller and the pressure roller to a shaft, the intermediate piece comprising a base body capable of being slipped onto the shaft,
    wherein the base body is designed in a sleeve-shaped manner and with a slot in a longitudinal direction of the base body.

9. The transport device according to claim 2, wherein the stop element is arranged on the opposite side of the fixing pin.

10. The transport device according to claim 4, wherein the pin is arranged in the pressure lever so as to be removable for an exchange of the pressure roller.

11. The transport device according to claim 4, wherein the pressure roller is mounted so as to be displaceable along the pin.

12. The transport device according to claim 4, wherein the pin is arranged in a central longitudinal region of the pressure lever.

13. The transport device according to claim 7, wherein the socket element comprises a recess extending centrally to the bearing bore and at least partially through the socket element.

14. The transport device according to claim 7, wherein the socket element is designed as at least one of a retaining element and a socket fastener.

15. The transport device according to claim 7, wherein the socket element comprises an internal thread in the bearing bore.

16. The transport device according to claim 7, wherein the at least one of the drive roller and the pressure roller further comprises at least one centering surface.

17. The transport device according to claim 7, wherein an outer side of the socket element is configured for at least one of:
    fastening by aid of a tool; and
    manual operation.

18. The transport device according to claim 7, wherein the socket element comprises intermediate fasteners for fastening to an intermediate piece connected with the shaft.

19. The transport device according to claim 7, wherein the shaft is connected with a drive motor directly or via an interposed gear.

20. The transport device according to claim 8, wherein the intermediate piece further comprises a screw connection arranged on the base body for clamping or fastening to the shaft.

21. The transport device according to claim 8, wherein the intermediate piece further comprises an external thread arranged on the base body for fastening the at least one of the drive roller and the pressure roller.

22. The transport device according to claim 8, wherein the shaft is a drive motor shaft, and
    wherein the base body is fastened to the shaft directly or via an interposed gear.

23. The transport device according to claim 8, wherein at least one of a centering surface and a planar surface is arranged on an inner surface of the base body for positioning the at least one of the drive roller and the pressure roller.

24. The transport device according to claim 8, wherein an outer surface of the base body is configured for at least one of:
    fastening by aid of a tool; and
    manual operation.

25. The transport device according to claim 8, wherein the base body has a cap-shaped configuration.

26. The transport device according to claim 10, wherein the tension bracket is arranged in a fixed position at least partially above the pin to prevent a longitudinal movement of the pin.

27. The transport device according to claim 17, wherein an outer side of at least one of the at least one of the drive roller and the pressure roller and the socket element comprises a stop surface.

28. The transport device according to claim 18, wherein the intermediate piece comprises at least one of a corresponding centering surface and a stop surface for positioning.

29. An assembly comprising a device for transporting a welding wire and a thread-in mechanism for the device for transporting a welding wire, the device for transporting including:
at least one roller pair comprising a drive roller and a pressure roller, wherein the drive roller is coupleable with a drive motor, and
a tensioning device for tensioning the welding wire,
wherein the pressure roller is mounted in a pivotable pressure lever,
wherein the tensioning device comprises:
a tension bracket capable of being connected with the pressure lever for fixation and pressure application,
an adjuster for adjusting the application pressure exerted by the pressure roller on the welding wire, the adjuster being arranged above, below, or above and below the welding wire and transversely to a conveyance direction of the welding wire, the adjuster comprising a tie rod, a spring element, and an adjustment disk, and the tension bracket being pivotally or rotationally connected with the tie rod, and
a passageway for the passage of the welding wire,
wherein the tension bracket and the pressure lever comprise a fixing device,
wherein said fixing device is formed by:
at least one bore provided on the tension bracket or on the pressure lever, and
a corresponding fixing pin provided on the pressure lever or on the tension bracket, respectively, and engageable in the at least one bore,
wherein the pressure lever has a pivot axis and the pressure lever is fastened to a housing or mounting plate so as to be rotational about the pivot axis, and
wherein the pivot axis is arranged in an end region or an edge region of the pressure lever in a region of the fixing pin, and
the thread-in mechanism comprising:
a spacer element able to be displaceably arranged such that, for threading in of the welding wire, a distance between the drive roller and the pressure roller is adjustable in a manner such that at least one of a defined distance between the pressure roller and the drive roller and a defined, reduced application force of the pressure roller and the drive roller relative to each other is provided.

30. The assembly according to claim 29, wherein the at least one of a defined distance between the pressure roller and the drive roller and a defined, reduced application force of the pressure roller and the drive roller is a defined distance between the pressure roller and the drive roller is provided, and
wherein the spacer element has a contour via which the defined distance between the drive roller and the pressure roller is adjustable upon displacement.

31. The assembly according to claim 29, wherein the spacer element can be connected with at least one of the pressure roller and the drive roller.

32. The assembly according to claim 29, wherein the spacer element can be arranged so as to be axially displaceable relative to a bearing axis of the pressure roller or the drive roller.

33. The assembly according to claim 29, wherein the spacer element is designed as an eccentric, and
wherein the at least one of a defined distance between the pressure roller and the drive roller and a defined, reduced application force of the pressure roller and the drive roller is adjustable by rotation.

34. The assembly according to claim 29, wherein the spacer element has a conical configuration, and
wherein the at least one of a defined distance between the pressure roller and the drive roller and a defined, reduced application force of the pressure roller and the drive roller is adjustable by longitudinal displacement.

35. The assembly according to claim 29, wherein the spacer element is connected with an automatic adjuster.

36. The assembly according to claim 29, wherein the spacer element is designed to be elastic, and
wherein the at least one of a defined distance between the pressure roller and the drive roller and a defined, reduced application force of the pressure roller and the drive roller is adjustable by a volume change.

37. A self-centered roller pair for transporting a welding wire, the self-centered roller pair comprising:
a drive roller;
a pressure roller; and
at least one centering element;
wherein the drive roller and the pressure roller include:
a groove for receiving the welding wire; and
a bearing bore in a center of the drive roller and the pressure roller;
wherein the drive roller and the pressure roller are, via the bearing bore, each arrangeable on a shaft or an axle; and
wherein the at least one centering element is designed as a V-shaped projection on a circumference of the drive roller and is arranged on at least one of the pressure roller and the drive roller to effect mutual axial alignment of the pressure roller and the drive roller relative to each other and to effect mutual axial alignment of the pressure roller and the drive roller relative to the welding wire,
wherein the pressure roller has a V-shaped indentation corresponding to the V-shaped projection such that in a wire-transporting position of the drive roller and the pressure roller the V-shaped projection projects into the V-shaped indentation, and
wherein the groove for receiving the welding wire is provided in at least one of the V-shaped indentation and the V-shaped projection.

38. The self-centered roller pair according to claim 37, wherein the at least one centering element is designed as a funnel-shaped indentation on a circumference of the pressure roller.

39. The self-centered roller pair according to claim 37, wherein the pressure roller is mounted so as to be displaceable in a direction of an axis of rotation.

40. The self-centered roller pair according to claim 37, wherein the drive roller is rigidly connected with the shaft.

41. The self-centered roller pair according to claim 37, wherein the pressure roller is mounted so as to be displaceable in a direction of an axis of rotation.

42. The self-centered roller pair according to claim 37, wherein the drive roller is connected with a drive motor via at least one of the shaft and a gear.

43. The self-centered roller pair according to claim 37, wherein the at least one centering element is arranged to be laterally offset relative to the groove.

44. The self-centered roller pair according to claim 37, wherein the at least one centering element comprises a first centering element and a second centering element, the groove for receiving the welding wire being arranged between the first and second centering elements.

45. A device for detecting the transport speed of a welding wire, the device including:
a housing comprising a first housing part and a second housing part and containing a rotary encoder and a roller fastened to the rotary encoder, the rotary encoder being able to have an active connection with the welding wire via the roller and the rotary encoder detecting rotational movement of the roller, wherein the rotary encoder can be connected with a control device of at least one of a welding apparatus and a wire transport device,
at least one slide element for guiding the welding wire, wherein the at least one slide element is formed with a passageway for the welding wire and is formed with a recess, and
a sensor for detecting a presence of the welding wire in the device, the sensor being arranged between the first housing part and the second housing part, comprising an electrical contact element, causing activation of the device when the presence of the welding wire is sensed, and causing deactivation of the device when no presence of a welding wire is sensed,
wherein the roller engages said recess in a manner such that, when the welding wire is inserted in the at least one slide element, the roller contacts the welding wire, and
wherein said at least one slide element is configured to perform at least one function selected from the group consisting of:
exerting application pressure between the welding wire and the roller; and
taking up application pressure between the welding wire and the roller.

46. The device according to claim 45, wherein the at least one slide element comprises a plurality of slide elements, and
wherein the welding wire is unguided in the region of the roller when the plurality of slide elements guides the welding wire.

47. The device according to claim 45, wherein the rotary encoder is rigidly connected with at least the first housing part and is resiliently mounted so as to be movable relative to at least one of:
the second housing part, and
the at least one slide element.

48. The device according to claim 45, further comprising a spring arranged between the first housing part and the second housing part.

49. The device according to claim 45, wherein the at least one slide element is fastened to the first housing part.

50. The device according to claim 45, wherein the at least one slide element is comprised of two parts.

51. The device according to claim 45, further comprising a gear arranged between the roller and the rotary encoder.

52. The device according to claim 45, wherein a surface of the roller is designed to be smooth.

53. The device according to claim 45, wherein the roller has a groove for the welding wire.

54. The device according to claim 45, wherein the roller is made of a material having poorer slip properties than a material of the welding wire has.

55. The device according to claim 49, wherein a channel for receiving a cable for the rotary encoder is provided on the first housing part.

* * * * *